(12) United States Patent
Wang

(10) Patent No.: US 7,817,137 B2
(45) Date of Patent: Oct. 19, 2010

(54) COMPUTER MOUSE WITH A SLIDING COVER

(75) Inventor: Dannie Wang, Taipei (TW)

(73) Assignee: Sysgration Ltd., Taipei (TW)

( * ) Notice: Subject to any disclaimer, the term of this patent is extended or adjusted under 35 U.S.C. 154(b) by 925 days.

(21) Appl. No.: 11/672,039

(22) Filed: Feb. 6, 2007

(65) Prior Publication Data

US 2008/0186277 A1   Aug. 7, 2008

(51) Int. Cl.
*G09G 5/08* (2006.01)

(52) U.S. Cl. ....................................... 345/163

(58) Field of Classification Search .................. 345/157, 345/163, 164, 165, 166, 167
See application file for complete search history.

(56) References Cited

U.S. PATENT DOCUMENTS 6,304,249 B1 * 10/2001 Derocher et al. ............ 345/163
6,323,842 B1 * 11/2001 Krukovsky .................. 345/163
2007/0188452 A1 * 8/2007 Chen et al. .................. 345/163

* cited by examiner

*Primary Examiner*—Richard Hjerpe
*Assistant Examiner*—Tom V Sheng
(74) *Attorney, Agent, or Firm*—Chun-Ming Shih

(57) ABSTRACT

A computer mouse includes a sliding cover and a control platform. The sliding cover is disposed on the top surface of the computer mouse, and the control platform is disposed under the sliding cover. Several control keys are provided on the control platform. Two rails are provided on the sliding cover and two grooves are provided on the computer mouse so that the sliding cover may be slid downwards. When the sliding cover is slid downwards, the control keys may be automatically activated. When the sliding cover is closed, the computer mouse looks like a regular computer mouse; when the sliding cover is opened, the control keys may be automatically activated and a user may access the control keys.

6 Claims, 5 Drawing Sheets

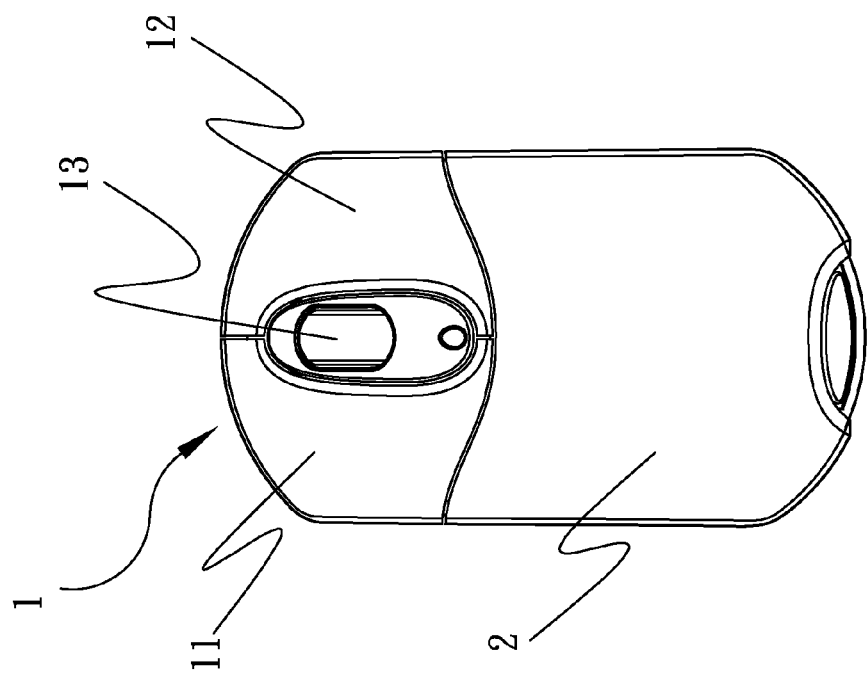
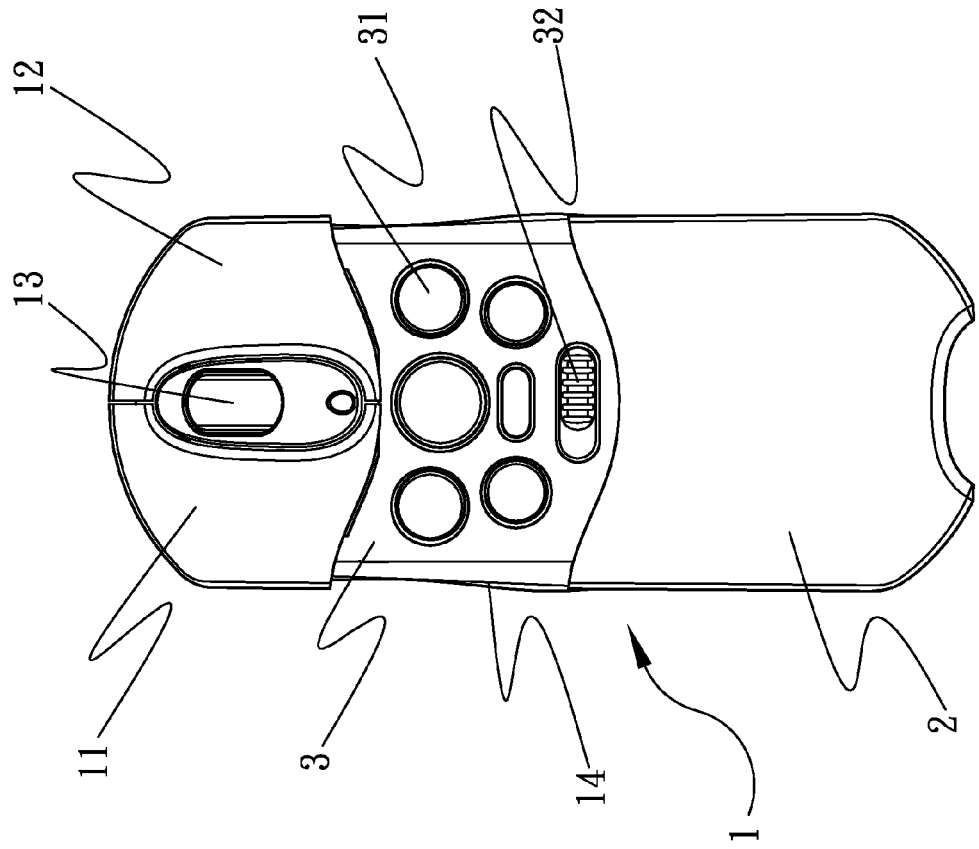

COMPUTER MOUSE WITH A SLIDING COVER

BACKGROUND OF THE INVENTION

1. Field of the Invention

The invention generally relates to a computer mouse. More particularly, the invention relates to such a computer mouse with a sliding cover when the sliding cover is closed, the computer mouse of the present invention may be used as a regular computer mouse; when the sliding cover is opened, a user may access the control keys. The computer mouse of the present invention has a nice appearance and an ergonomic design and is easy to use.

2. Description of the Prior Art

Most of the modern electronic devices have a screen. Take computer as example; a user may use a mouse to move the cursor on the screen or to activate something by pointing the cursor at a certain place corresponding to a particular function and clicking on it. The mouse can sense the user's motion and clicks and send them to the computer so it can respond appropriately. The computer mouse is easy to use.

In the beginning, the computer mouse has only one button; later, the computer mouse has two buttons and then three buttons; then, the third button was evolved into a scroll wheel with the function of a button Then, more buttons were provided on the computer mouse, but such design did not acquire much market share because we only have four fingers and one thumb on our hand and such design was not ergonomic.

With the fast advancement of the hardware and software of electronic devices, computer may be used for ordinary purposes and briefings and even as a home entertainment center. Therefore, various types of input devices (such as pointing pen, joy stick and media player remote control) are to be provided.

In the related art, mice with more control keys have been developed. However, the additional control keys affect the appearance of a mouse and hinder the regular use of a mouse; in addition, these keys are easily pressed by accident.

To eliminate the disadvantages of the prior art, the inventor has put in a lot of effort in the subject and has successfully come up with the computer mouse of the present invention. During the regular use, the control keys may be hidden by the sliding cover; when a user needs to access the control keys, he may open the sliding cover. Also, such sliding cover would not increase the size of a computer mouse and would not affect the nice appearance of a computer mouse.

SUMMARY OF THE INVENTION

The present invention is to provide a computer mouse in which a sliding cover is used to hide several control keys so that the mouse may have additional functions and may be used in more applications.

The present invention is to provide a computer mouse in which the sliding cover does not affect the size or nice appearance of the mouse so that a user may use the mouse as a regular mouse and may use it easily.

The present invention is to provide a computer mouse in which the sliding cover has an arcuate shape and may be slid open in an arcuate manner so as to enhance the appearance of the mouse and to make the mouse of the present invention more popular.

The computer mouse of the present invention comprises a sliding cover and a control platform. The sliding cover is disposed on the top surface of the computer mouse, and the control platform is disposed under the sliding cover. Several control keys are provided on the control platform. Two rails are provided on the sliding cover and two grooves are provided on the computer mouse so that the sliding cover may be slid downwards. A trigger switch or a sensor may be used so that the control keys may be automatically activated when the sliding cover is slid downwards. During the regular use, the control keys may be hidden by the sliding cover, and the use may use the mouse like a regular mouse. When a user needs to access the control keys, he may open the sliding cover by sliding the sliding cover downwards.

BRIEF DESCRIPTION OF THE DRAWINGS

The drawings disclose an illustrative embodiment of the present invention which serves to exemplify the various advantages and objects hereof, and are as follows:

FIG. 4 is a top view of the computer mouse of the present invention, with the sliding cover opened.

FIG. 5 is a top view of the computer mouse of the present invention, with the sliding cover closed.

DETAILED DESCRIPTION OF THE PREFERRED EMBODIMENT

Please see FIG. 1 to FIG. 8. The computer mouse of the present invention may be either a conventional mouse or a wireless mouse; it may be a ball type mouse or an optical mouse; it may have a button, several buttons and/or a scroll wheel. A sliding cover 2 is provided on a computer mouse 1 so as to cover a control platform 3. Several control keys 31 are provided on the control platform 3. When a user opens the sliding cover 2, he may access the control keys 31.

Figure 3:
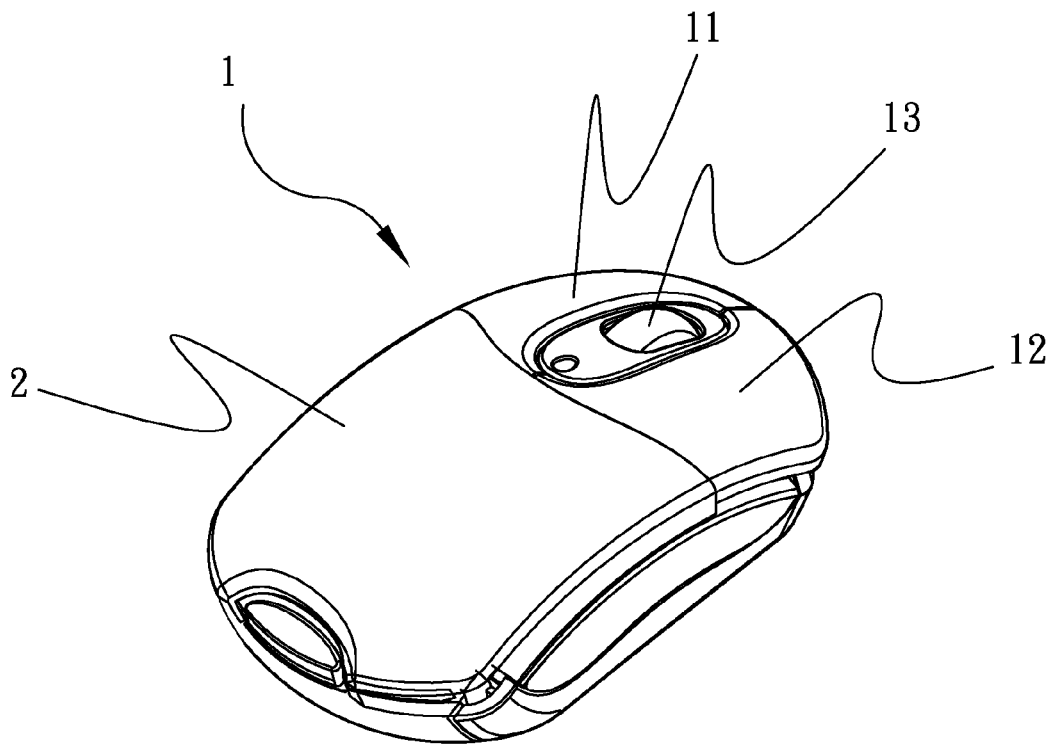
FIG. 3 is a perspective view of the computer mouse of the present invention, with the sliding cover closed.
Figure 6:
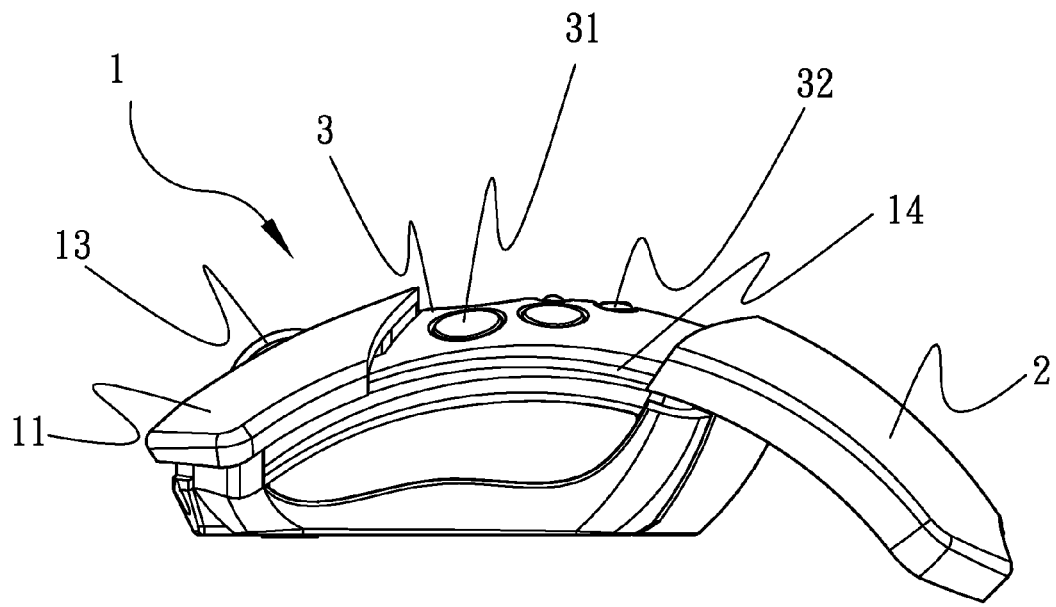
FIG. 6 is a side view of the computer mouse of the present invention, with the sliding cover opened.
Figure 7:
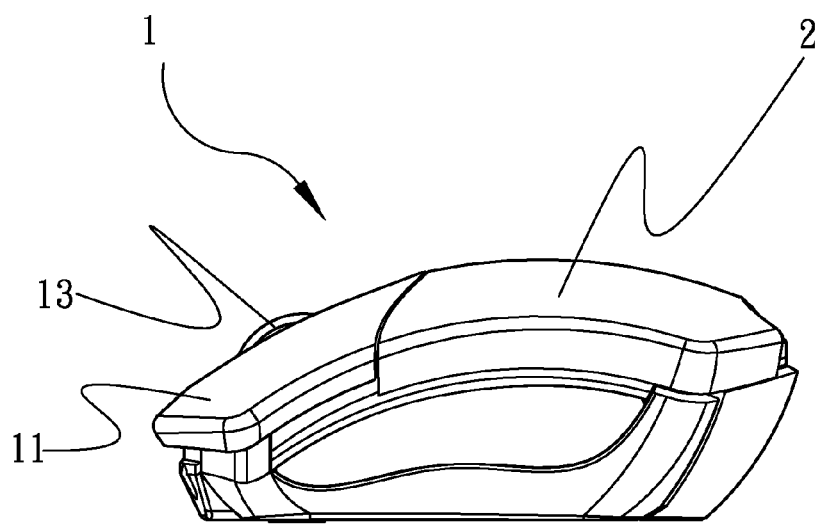
FIG. 7 is a side view of the computer mouse of the present invention, with the sliding cover closed.

As illustrated in FIGS. 3, 5 and 7, when the sliding cover 2 is closed, the sliding cover 2 rests on the control platform 3 and the computer mouse 1 looks like a regular computer mouse. Now, the user may use the left button 11, the right button 12 and the scroll wheel 13 of the computer mouse 1. When the uses needs to use the control keys 31, the user may slide the sliding cover 2 downwards, as illustrated in FIGS. 1, 2, 4, 6 and 8.

Figure 1:
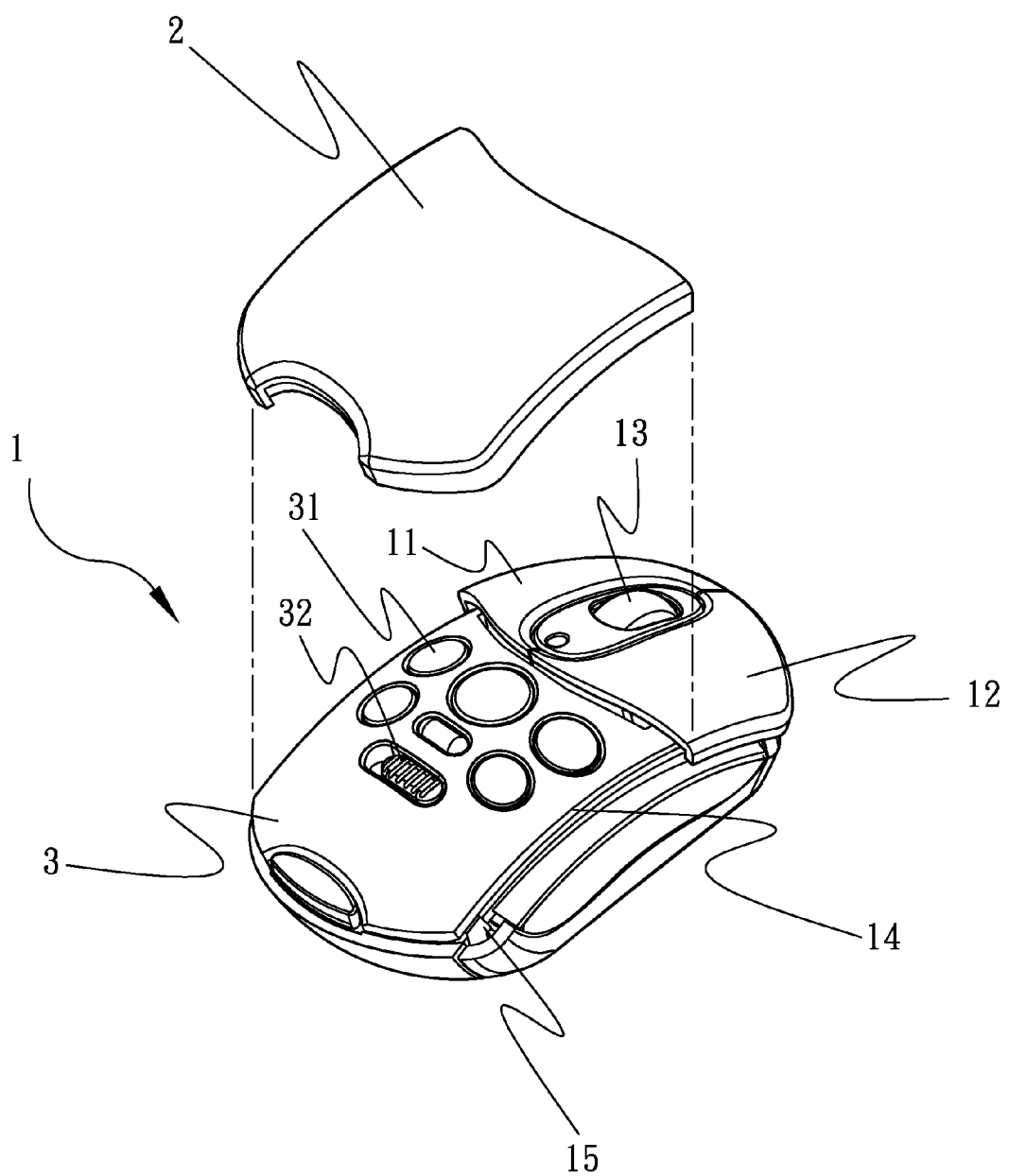
FIG. 1 is a perspective view of the computer mouse of the present invention, with the sliding cover detached.
Figure 2:
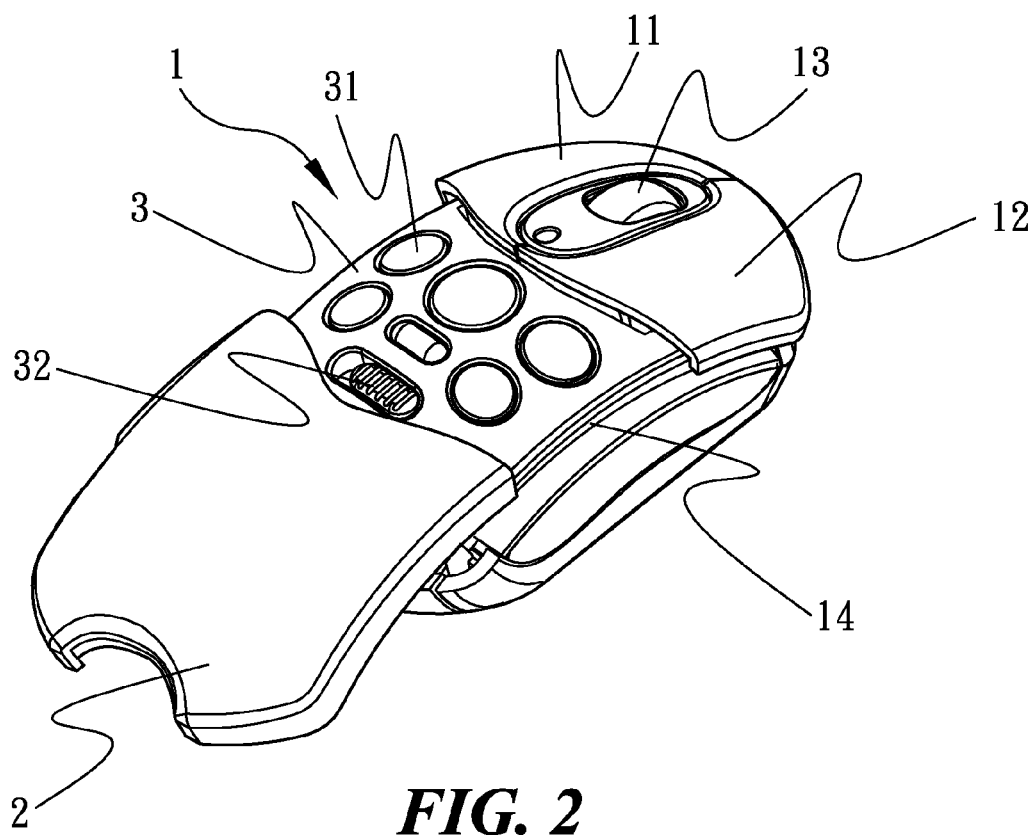
FIG. 2 is a perspective view of the computer mouse of the present invention, with the sliding cover opened.
Figure 8:
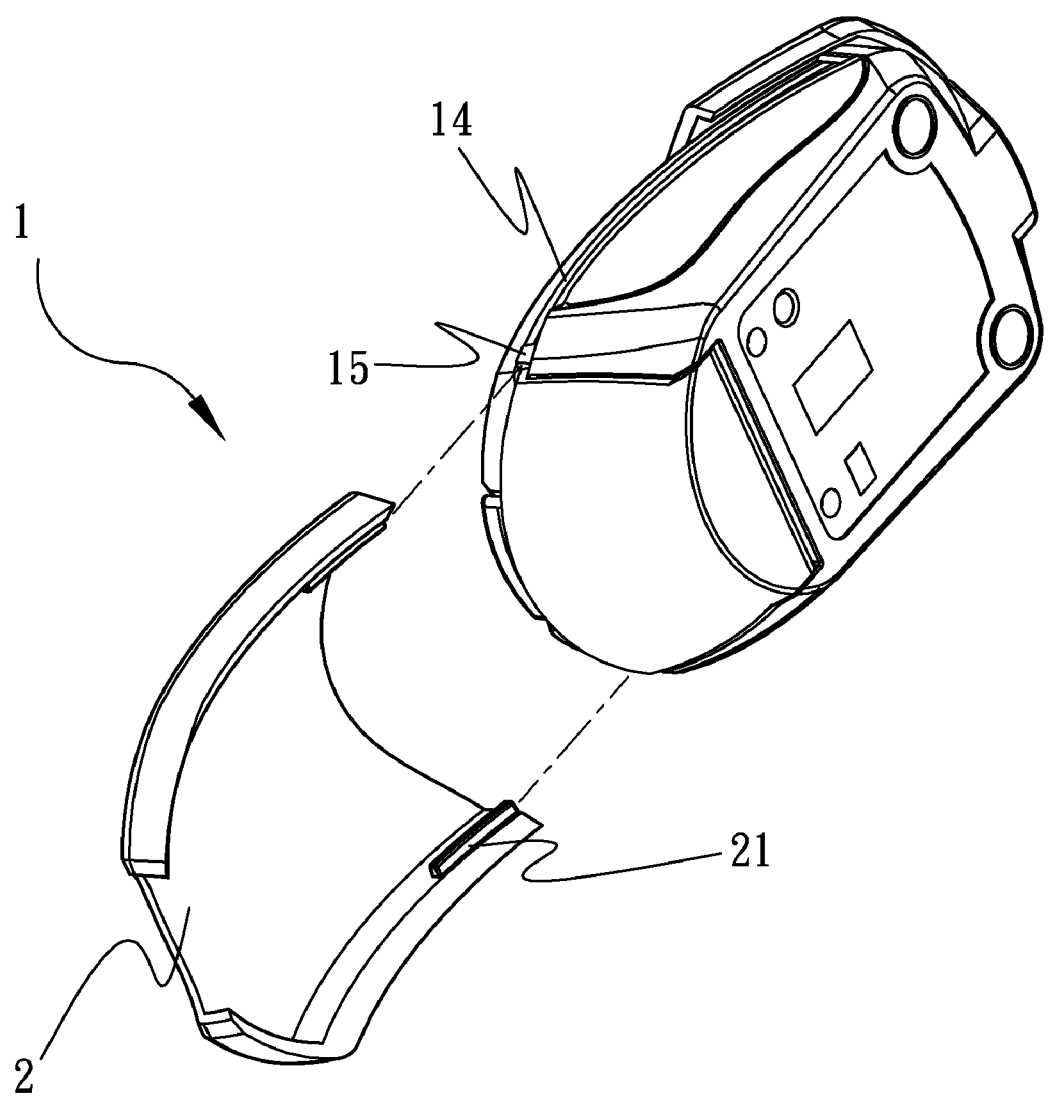
FIG. 8 is another perspective view of the computer mouse of the present invention, with the sliding cover detached.

As illustrated in FIGS. 1 and 8, the sliding cover 2 may be slid on the computer mouse 1 through two rails 14 and two grooves 21. Also, the rails 14 and the grooves 21 have an arcuate shape so that the sliding cover 2 may be slid open in an arcuate manner. In addition, other types of connective methods may be used to achieve the same result. Two protrusions 15 are provided on the proximal ends of the rails 14 or the grooves 21 so that the sliding cover 2 will not be separated from the computer mouse 1.

Because a user uses the control keys 31 occasionally, the control keys 31 may be deactivated most of the time; they may be activated when the user needs to use them so as to save electricity. A switch 32 may be disposed on the control platform 3 and may be used to activate and deactivate the control keys 31. Alternatively, a trigger switch (not shown in the drawings) may be provided on the area connecting the sliding cover 2 with the computer mouse 1 so that the control keys 31 may be activated when the sliding cover 2 is slid downwards. Also, a sensor may be used to activate the control keys 31. Other methods may be used to achieve the same purpose, and these methods should be included in the scope of the present invention.

The activation mechanism and the circuits of the control keys 31 and the relevant electricity supplying mechanism and interface are disposed inside the computer mouse 1. This has been well known in the art, and we will not elaborate on it.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A computer mouse comprising a sliding cover and a control platform, wherein the sliding cover is disposed on top surface of the computer mouse and the control platform is disposed under the sliding cover, and wherein several control keys are provided on the control platform, and the sliding cover rests on the control platform and slid downwards for a user to access the control keys, wherein a trigger switch is provided on the area connecting the sliding cover with the computer mouse so that the control keys is activated when the sliding cover is slid downwards.

2. The computer mouse as in claim 1, wherein two rails are provided on the sliding cover and two grooves are provided on the computer mouse so that the sliding cover may be slid downwards.

3. The computer mouse with a sliding cover as in claim 2, wherein two protrusions are provided on the proximal ends of the rails or the grooves so that the sliding cover is not separated from the computer mouse.

4. The computer mouse with a sliding cover as in claim 2, wherein the rails and the grooves have an arcuate shape which matches that of the top surface of the computer mouse so that the sliding cover is slid open in an arcuate manner.

5. The computer mouse with a sliding cover as in claim 1, wherein a sensor is used to activate the control keys.

6. The computer mouse with a sliding cover as in claim 1, wherein a switch is disposed on the control platform and is used to activate and deactivate the control keys.

* * * * *